July 6, 1965

E. W. CARROLL 3,192,833

MILLING MACHINE FOR CUTTING AIR VENTS IN GLASS MOLDS

Filed June 6, 1963

INVENTOR.
EDWARD W. CARROLL
BY
*William D. Carothers*
HIS ATTORNEY

INVENTOR.
EDWARD W. CARROLL
BY
HIS ATTORNEY

July 6, 1965 E. W. CARROLL 3,192,833
MILLING MACHINE FOR CUTTING AIR VENTS IN GLASS MOLDS
Filed June 6, 1963 6 Sheets-Sheet 6
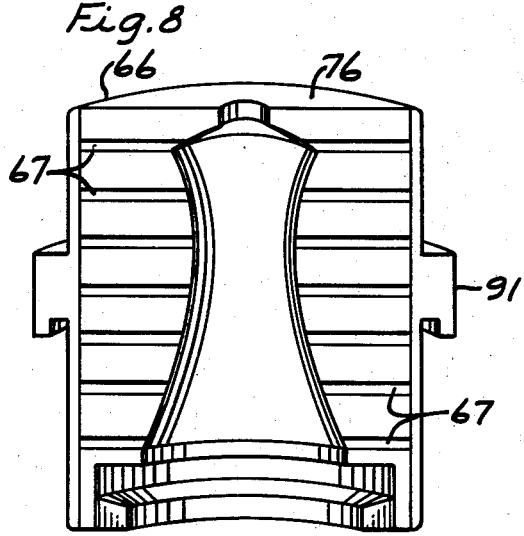
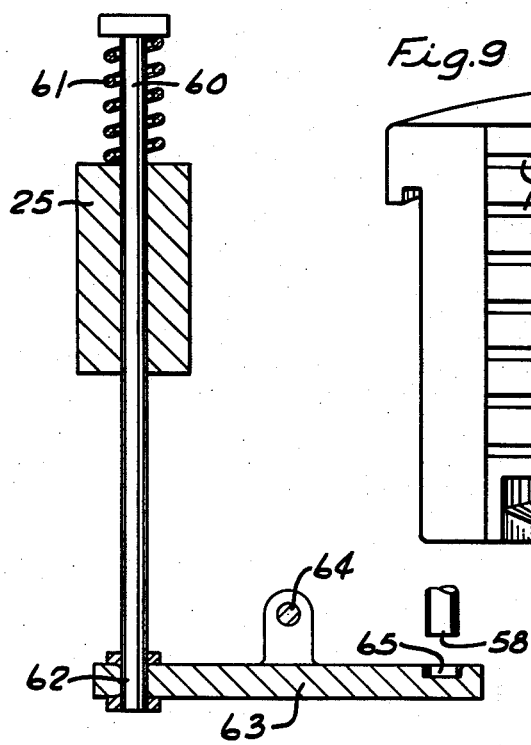
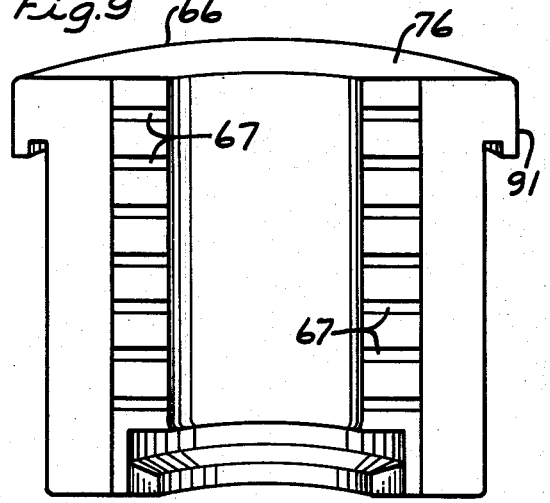
INVENTOR.
EDWARD W. CARROLL
BY
HIS ATTORNEY

United States Patent Office 3,192,833
Patented July 6, 1965

3,192,833
MILLING MACHINE FOR CUTTING AIR
VENTS IN GLASS MOLDS
Edward W. Carroll, 1729 N. Main St., Washington, Pa.
Filed June 6, 1963, Ser. No. 285,990
7 Claims. (Cl. 90—15)

This invention relates generally to multiple cutter milling machines and more particularly to a milling machine for cutting air vents in glass molds.

The problem of cutting air vents in the abutting flat faces of glass mold has always been expensive since each air vent required a different set up of the workpiece or by one set up only one air vent could be formed at a time on a standard milling machine. Air vents are usually made five thousandths of an inch deep. Such a vent will allow the air to escape, but the hot gob of glass in a mold that is either pressed or blown will not flow into an air vent of seven thousandths of an inch deep.

Usually the female half of the mold will have the air vents cut transversely across its mold engaging face thus utilizing the full depth of the vent on one half of the mold while the other flat engaging face of the male mold remains a uniform surface. This avoids the necessity of setting up both mold halves for the same purpose and it is difficult to set up a mold half when the exterior thereof is cylindrical. It is not only difficult to set up for milling but it is hard to maintain this set up for each of the seven or more air vents cut in abutting transverse flat faces of the female mold halves. If one attempts to use these flat abutment faces as the clamping faces in the set up of the mold there is no space left with which to cut the narrow multiple air vent bands. This problem then requires the use of these abutment faces as the gauge faces but clamping on the inner bore of the mold or at least one end extremity. This is not only difficult but not acceptable as one runs the chance of soiling the inner mold surface which is ordinarily finished to a high polish by the time the female mold half is to have the air vents cut therein. Usually it is one of the last steps and a scratch or mar on the interior mold surface would necessitate it being repolished which is expensive in the first place.

The problem is very old. It is in fact as old as split molds have been used, yet there has been no answers for this problem and the expense that arises therefrom.

The present invention eliminates all of these problems by employing the fact in which the air vents are cut as the gauge face in setting up the mold half in the milling machine. All mold halves have squared ends and one end is used to receive the mold bottom elements which receive the gob of molten glass and the initial pressure to fill the neck end of the mold. The other end or the neck mold end, if one is employed, is also squared off. Either of these squared off ends could be employed as a gauge surface to set the mold half for the purpose of cutting a plurality of parallel air vents therein. Thus with two gauge surfaces the mold half need only be laid flat on the table gauge surface with one end gauged against a fence. This is readily done by merely placing the mold half on the table gauge surface and sliding the same against the fence gauge surface and setting a single clamp thereon. The clamp that engages the back of the mold, even though arcuate, provides a point or line of contact that is adequate since the flat faces of the mold half is against the table surface. The slots in the table which admit the end of the milling cutters do not represent a sizable loss in surface clamping friction and that the lands therebetween provide adequate clamping surface for the mold half.

Other objects and advantages appear hereinafter in the following description and claims.

The accompanying drawings show for the purpose of exemplification without limiting this invention or the claims thereto certain practical embodiments illustrating the principles of this invention, wherein FIG. 1 is a view in perspective showing the front of the milling machine comprising this invention.

FIG. 7 is a sectional view showing a modified form of spindle head.

FIG. 8 is a perspective view of a glass mold half for a glass bottle, the intermediate section of which is contracted, showing the abutment sides with the air vents cut therein.

FIG. 9 is a perspective view of a glass mold half for a cylindrical glass bottle showing the abutment sides with the air vents cut therein.

Figure 1:
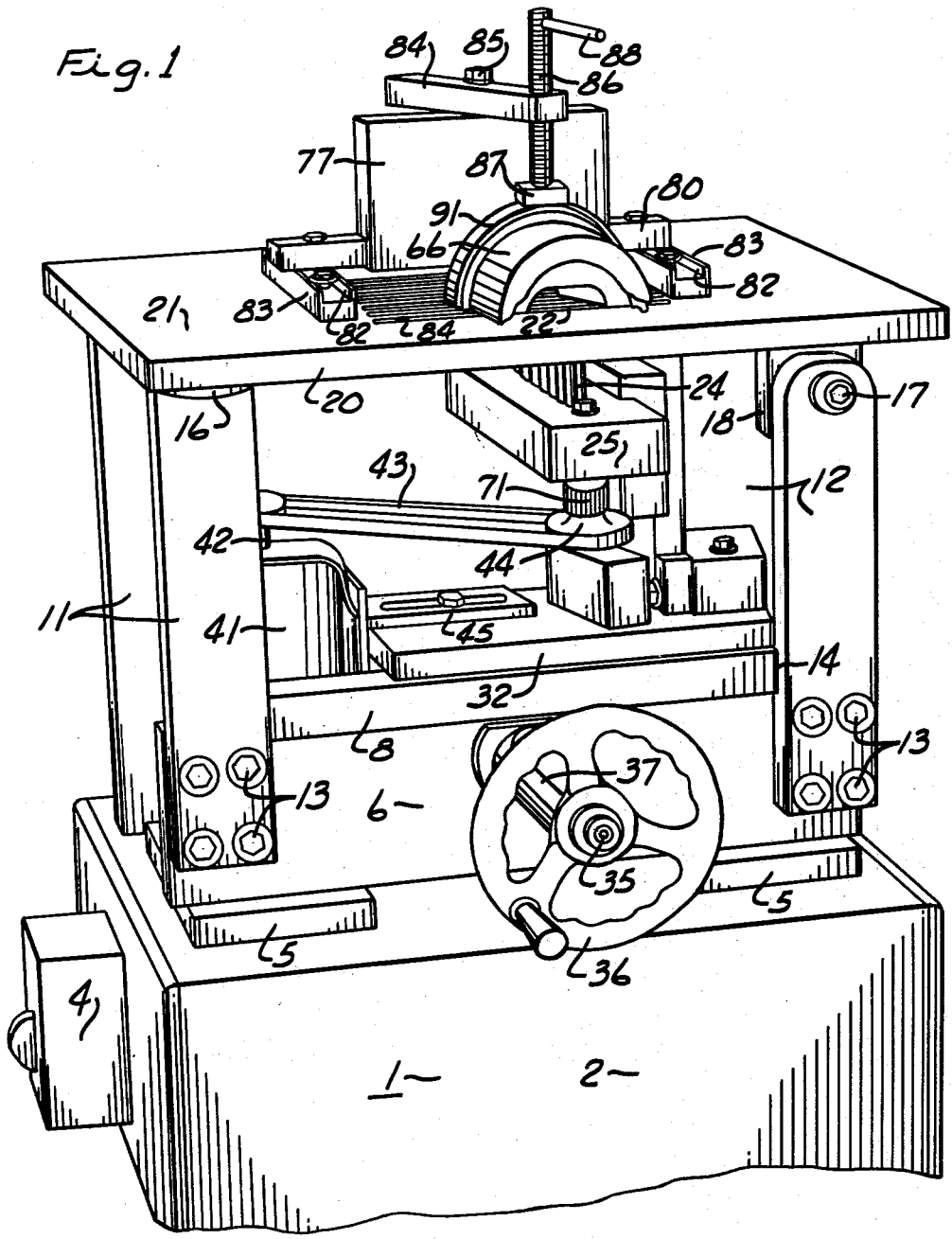
Figure 2:
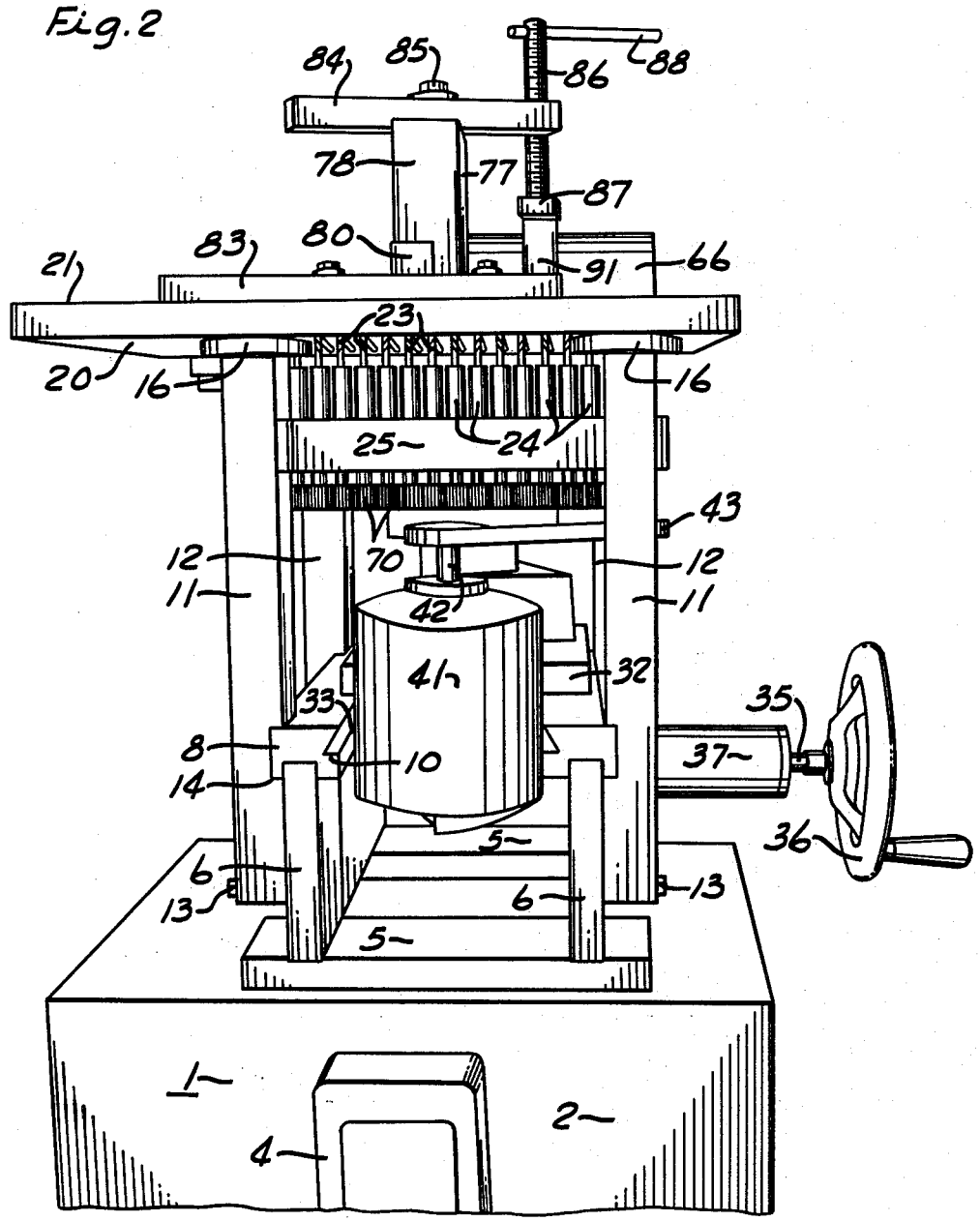
FIG. 2 is a perspective view showing the side of the milling machine comprising this invention.

The milling machine for simultaneously cutting a series of air vents in the abutment faces of glass mold halves is a small machine as indicated on the drawings and is arranged to be mounted on a stand 1 as shown in FIGS. 1 and 2 which comprises a heavy body member 2 having four legs 3 and is a conveyor member for mounting the switch member 4 to supply power to a machine.

Figure 4:
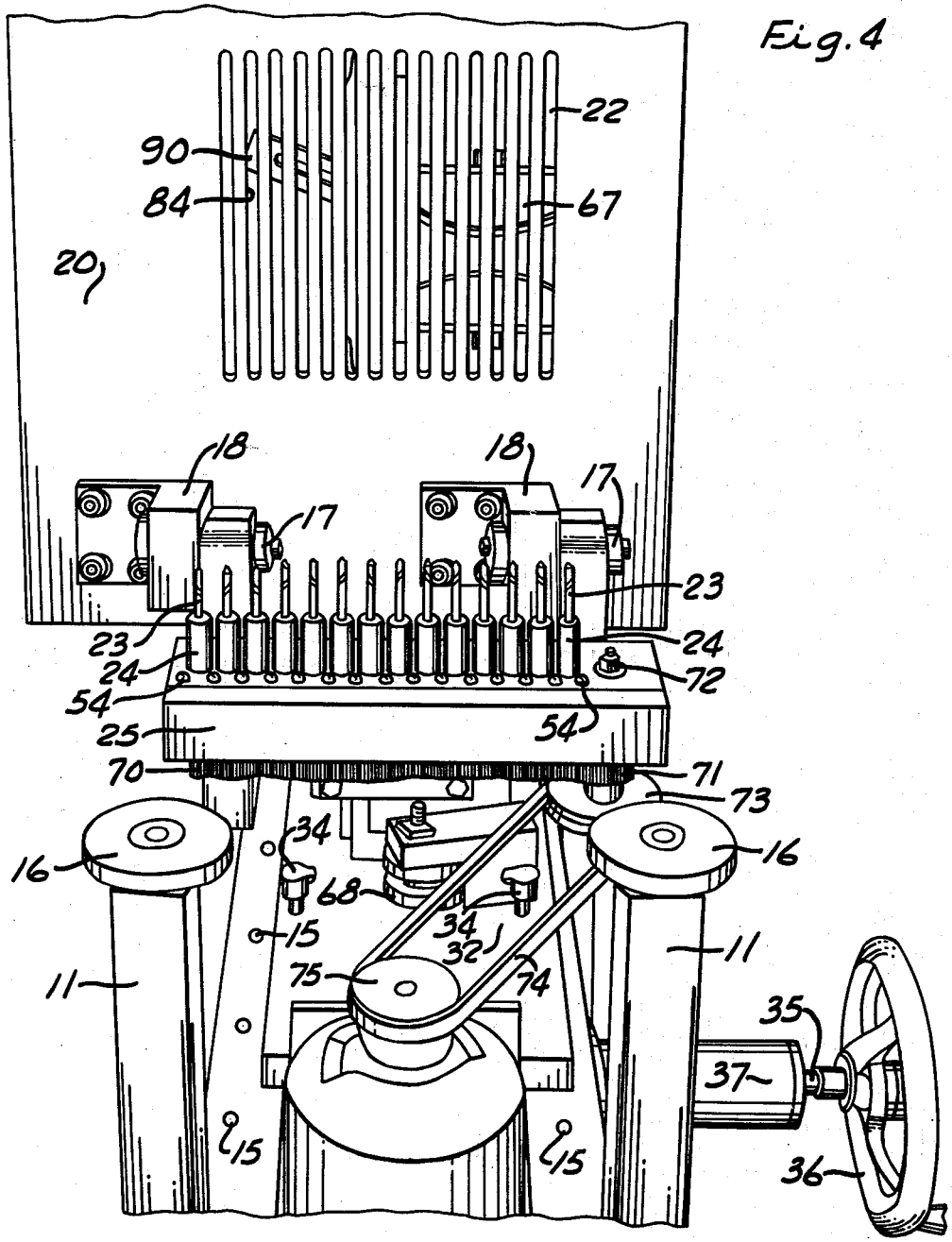
FIG. 4 is a view in perspective showing the side of the milling machine with the table raised.

The top of the stand 1 is provided with the two steel pads 5 which are welded or otherwise secured to the transverse parallel member 6 which are secured in spaced relation to each other on the upper surface of the pads 5 and provide a very heavy base for the machine which is indicated by the reference numeral 7. The top of the transverse parallel members 6 have the ways 8 secured thereto. The underside of these ways are grooved to receive the tops of the parallel members 6 to which they are permanently secured and each way 8 has an upwardly and inwardly extending opposed notch 10. At the ends of the parallel members 6 the base 7 is provided with upwardly extending legs 11 and 12. Each of these legs are secured to the outer face of the parallel members 6 by means of bolts 13 and each leg has an inwardly open notch 14 to receive the outer portion of the ways 8 and thereby interlock each of the legs with the base 7. As illustrated in FIG. 4 each of the ways 8 are secured to the parallel members 6 by the screws 15 that extend through the ways 8 and down to the parallel transverse member 6.

The corner legs 11 are provided with the pad members 16 which may be adjustably secured to the top of the legs so as to provide a parallel table surface relative to the ways 8. These pads may also be raised so as to provide a sloping table surface relative to the ways 8.

Each of the legs 12 are provided with a horizontal pivot member 17. These pivot members are axially aligned with each other and are received in the corresponding aligned openings in the brackets 18 on the underside of the table member 20. Thus when the table member is down as illustrated in FIGS. 1 and 2 so that one end rests upon the pads 16, the opposite or hinged end supports the opposite end of the table through the legs 12 so that the table top surface 21 is referred to as a gauge surface and the table 20 is made, as are all the other parts of this miller, with heavy stock and will not readily change with changes in room temperature that is ordinarily found in machine shops of the character in which this miller would be situated. This finished gauge surface 21 of the table 20 functions as a gauge on the abutment faces of the glass mold halves as shown in FIGS. 8 and 9. The table 20 is provided with a series of parallel slots 22 of which there are fourteen in number, which slots correspond to their respective end millers 23 mounted in the chucks 24 of the spindle head. The spindle head is secured to the carrier 26 which has a vertical dove tail groove 27 to receive the vertical dove tail 28 on the standard 30 secured by the block 31 to the top of the carriage 32.

The carriage 32 rides on top of the ways 8 and the underside of the carriage supports the gibs 33 which are fastened by screws extending up into the carriage 32. These gibs are shimmed against the underside of the carriage so as to provide the proper clearance when in surface engagement with the sloping surfaces of the notches 10 forming the ways. Thus by properly shimming the gibs on the underside of the carriage, the latter is movable along the ways 8 with no apparent clearance that would cause chattering or action. These surfaces of the gibs and ways are greased by the lubricating members 34 more clearly shown by the oil cups 34 in FIG. 4.

The underside of the carriage 32 is also provided with a downwardly extending rack not shown which is engaged by the spur gear on the inner end of the shaft 35 that is actuated by the hand wheel 36 supported from the standard 37 on the face of the front member 6 forming the base 7. Thus by turning the hand wheel 36 the spur gear on the inner end of the shaft 35 will operate on the rack to move the carriage back and forth and thus move the end millers 23 to the opposite end of the slots 22 on the table.

Figure 3:
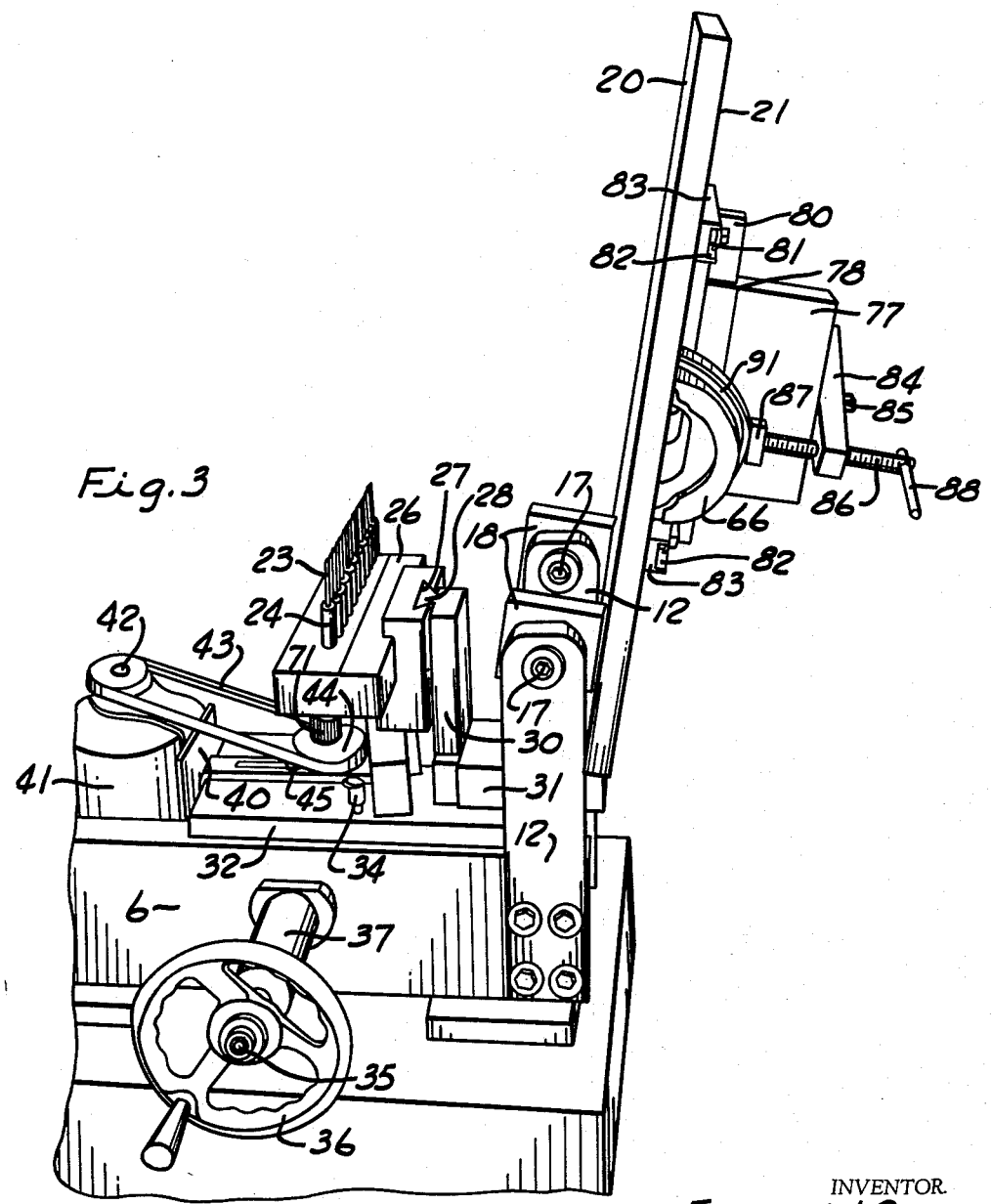
FIG. 3 is a view in perspective showing the front of the milling machine with the table raised.

The left end of the table as shown in FIGS. 1 and 3 is provided with an adjustable mounting bracket 40 for supporting the motor 41 which is provided with a drive pulley 42 to receive the belt 43 for the purpose of driving the pulley 44 which is rotatably mounted on the milling head 25. In order to take up the slack in the belt 43 the bolt 45 holding the bracket 40 is loosened and the motor bracket is moved outwardly.

Figure 6:
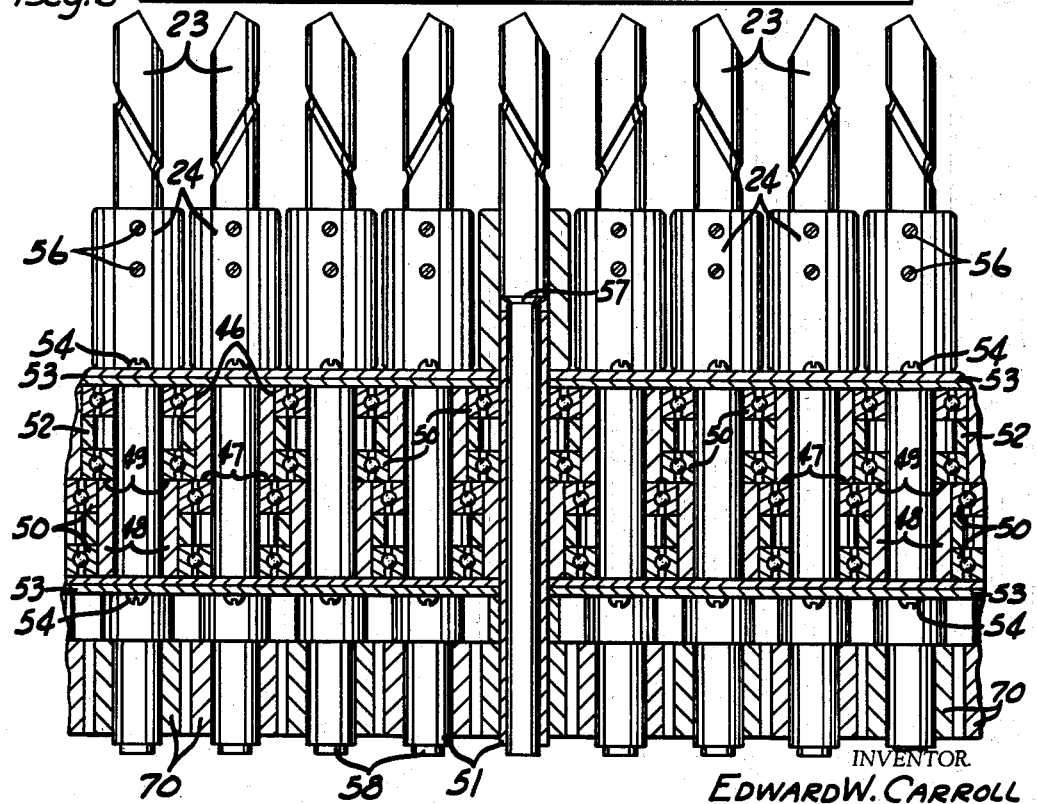
FIG. 6 is a sectional view of the spindle head shown in FIGS. 1 to 4.

As shown in FIG. 6 the miller spindle head 25 is provided with a series of alternate upwardly open large bores 46 are each provided with a shoulder 49. The other series of alterntae bores 48 are each provided with a shoulder 47. These upwardly and downwardly facing shoulders 49 and 47 respectively are in the same horizontal plane. These alternate bores overlap each other as illustrated in FIG. 6, but that portion not overlapping provides the shoulders mentioned. In view of the fact that it is necessary to have a bore sufficiently large to receive an antifrictional bearing such as indicated at 50 it is necessary to have the alternate bores 46 and 48 in different directions to provide the shoulders 47 and 49 for the bearings of adjacent hollow spindles 51.

FIG. 6 shows the oppositely facing shoulders 47 and 49 for receiving the bearings 50 for the adjacent hollow spindles 51 and as illustrated the inner bearing member 50 is seated on its respective shoulder and a spacer 52 separates the spaced bearing 50 and the outermost bearing and the bore 46 are held in place by the cap plate 53 secured by the screws 54 whereas the outer bearings 50 of the bores 48 are held by the plate 55 secured in place by the screws 54. The bearings separators 52 are made sufficiently thick so that the outer bearing is a few thousandths beyond the upper or lower face of the spindle head 25 and thus the cover plates 53 and 55 function as clamping members to hold the bearing assemblies in position with their inner races engaging their respective seats 47 and 49 and the spacer 52 engaging between the outer races of bearings 50 and the plates 53 and 55 engaging the outer bearings 50 on the top and bottom respectively of the spindle head 25.

Each hollow spindle 51 has secured at one end the chuck 24 which is provided with one or more of the Allen type set screws 56 to secure the end mills 23 in the socket of this chuck. Different types of chucks, of course, may be provided, but the one shown is simple and clearly illustrates the principles of this invention. The end mills 23 have a sliding fit in the bores of each of the chucks 24. However, the bottom of the end mill 23 is seated upon the head 57 of the tappet member 58 that extends through the bore of the rotary sleeve 51.

Referring to FIGS. 1, 2 and 7 it will be seen that by loosening the set screws 56 one may depress the reach rod 60 which is held in its upward position by the spring 61 which reach rod passes through a bore in the spindle head 25 and its lower end has a swivel connection 62 with the rocker arm 63 that is pivoted on the shaft 64. The shaft 64 is supported on the side of the spindle head 25 and when each of the end mills 23 are loosened in their sockets and their corresponding reach rod 60 is depressed, the rocker arm 63 will rock on the shaft 64 and the socket 65 will engage the bottom of the tappet 58 and force this tappet upwardly causing the head 57 to raise the end mill 23 to engage the under surface of the mold 66 as shown in FIGS. 1 and 2 which mold surface is indicated at 67 in FIGS. 8 and 9. Thus by depressing the reach rod 60 for each corresponding tappet 58 in the corresponding spindle 51 each end mill 23 may be seated against the under surface of the mold as viewed through the slots 22 in FIG. 4. This represents a very simple gauge. While the end mill 23 is so seated and the chuck screws 56 may be tightened and when each of the end mills are tightened in this manner their end cutting faces are in proper relation with the workpiece into which they are to cut the air vents.

At this time the whole spindle head 25 may be lowered by turning the micrometer screw 68 as shown in FIG. 4 to lower the head and the hand wheel 36 is then turned to traverse the millers to one side of the mold at which time the micrometer adjustable screw 68 may be again adjusted to raise the head so that the millers will cut a depth in the surface 67 of the mold 66 mounted on the table.

Another mode of doing this is after the millers are adjusted against the unfinished face 67 of the molds the table may be raised as illustrated in FIG. 4 and the micrometer may then be turned to raise the spindle head 25 the number of thousandths of an inch to cut these air vents which is usually approximately five thousandths of an inch. The mill ends are then in the proper position and the carriage may be moved to one side before the table is lowered so that when the motor is started and the table is lowered the milling may be progressive from one side of the mold to the other in either direction.

Each of the hollow spindles 51 are secured to the chucks 24 at one end and to the gears 70 at the other end. The rotary centers of each of the hollow spindles 51 are selected so that the gears 70 of adjacent spindles will intermesh on their pit circles and thus the series of gears across the spindle head 25 are all in alignment and are all in driving mesh with each other. The last gear 70 is intermeshed with the larger gear 71 that is mounted on the shaft 72 in the spindle head 25. The shaft 72 is likewise supported in spaced antifrictional bearings. However, the bore 46 for receiving these bearings extends from the top spindle of block 45 and the upwardly facing shoulder 47 is materially lower than the other shoulders and is spaced therefrom to provide for the larger diameter gear 71. The lower end of the shaft 72 is provided with a V-belt pulley 73 that is driven through the V-belt 74 from the pulley 75 on the motor 41. There is sufficient flexibility in the V-belt drive to allow for the vertical adjustment of the end millers by raising and lowering the spindle head relative to the motor. In all probability the greatest depth of cut made by these end millers would be in the nature of fifteen thousandths of an inch. Thus once the motor is set for a particular series of end millers 23 the spindle head may be raised and lowered for adjusting and for cutting the air vents in the mold faces without requiring further vertical movement of the motor on the bracket 40. Since the motor can be moved toward and away from the spindle head and vertically relative to the spindle head, adequate adjustments may be made for this spindle drive.

In view of the fact that the gears 70 and 71 are all disposed in alignment the adjacent gears and their end millers 23 will be rotated in opposite directions. This requires opposite left and right hand millers which is indicated by the ordinary twist as shown in the drawings, as these end millers have a similar appearance to a twist drill with a flat end which is the milling end.

As shown in each of the FIGS. 1 to 4 the mold 66 is clamped with its abutment face 67 against the top or gauge surface 21 of the table 20 and the transverse end face 76 of the mold is abutted against the flat gauge surface 77 of the bridge member 78. This bridge member 78 is supported from the transverse member 80 which has its ends secured to the parallel feet 81 that slide in the slot 82 of the track members 83 that are adjustably bolted to the top gauge surface 21 of the table 20. When the clamping bolts of the feet 81 are loosened the bridge member may be slid along the track 83 maintaining the gauge face 77 parallel with the slots 22 of the table when the track 83 is disposed at right angles to the slots.

The track, however, may be disposed at an angle relative to the slots 22 and thus dispose the gauge surface 77 at an angle relative to the slots. As this angle is sufficiently great the diameters of the end mills may be made to cut the under surface of the mold so that the cutting path of adjacent end mills are closely spaced or even overlapped.

Regardless of the adjusted position of the bridge member 78, the gauge face 77 is always at 90° to the gauge surface 21 of the table 20.

As shown in FIG. 2 the bridge member 78 is notched out to receive the transverse member 80 which is secured thereto and the under surface of both of these members is spaced above the table gauge surface 21. As illustrated in FIG. 2 only the first 6 end mills would be effective in cutting the abutment surface of the mold 66 as the carriage is reciprocated back and forth and the balance of the end mill cutters shown under and to the left of the bridge member 78 would be free and project upwardly underneath the bridge member and therefore would not be performing work. Thus this mold milling machine is adapted to receive molds of varying length. A mold that requires fourteen milled air vents may readily be cut by this machine because it is provided with fourteen end mills and the table surface has fourteen slots, one for each end mill and the bridge member may be adjusted so as to expose the mold for its full length even though greater than the dimension transversely of the fourteen slots 22. This is a particular advantage in this machine in that only those end mills need be adjusted against the mold they are to cut without disturbing or otherwise bothering with the rest of the end mills 23 as they merely repose idly in back of the gauge face 77 of the bridge member 78.

Figure 5:
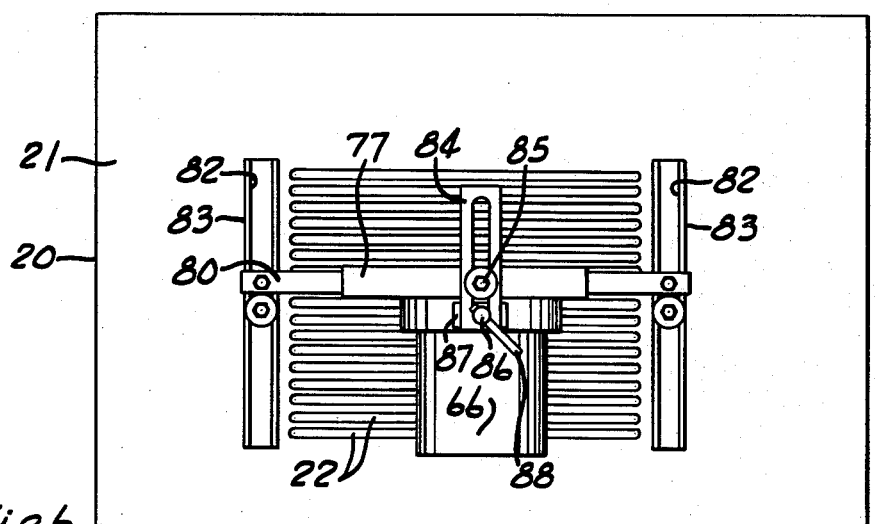
FIG. 5 is a plan view of the table with the fence mounted thereon.

The top of the bridging member 78 is provided with a clamping bar 84 which is bolted to the bridge member by the bolt member 85 and is provided at its other end with a clamping screw 86 having a swivel pad 87 and a tightening bar 88. As shown in FIGS. 4 and 5 the bar 84 is slotted as indicated at 90. This allows the clamping member to be extended until the foot 87 is over the heaviest portion 91 of the mold and which, of course, is the strongest part of the mold and provides the best mode of clamping the mold with its flat faces on the gauge surfaces 21 and 77.

I claim:

1. A machine for milling the surface of a workpiece consisting of a base, ways on said base, a carriage slidable along said ways, a plurality of rotary milling cutters rotatably mounted in a housing on said carriage and disposed in a direction transversely of said ways, drive means on said carriage interconnecting said rotary milling cutters, motor means on said carriage to actuate said drive means, feed means on said base to move said carriage along said ways and feed said rotary milling cutters to perform work, a table supported from said base and having an outer gauge surface with linear open slots for extending said milling cutters therethrough, a clamp to mount a workpiece on said table gauge surface over said linear open slots and to gauge the setting of each of said milling cutters, and means to extend said housing to position each rotary milling cutter to the same relative cutting depth to mill simultaneously openings in the surface of the clamped workpiece.

2. A machine for milling air vents in abutting faces of glass mold halves which consists of a base having ways, a carriage slidable along said ways, a miller spindle head mounted on a slide vertically movable on said carriage in micrometer increments, a plurality of spaced rotary end milling cutters operatively mounted in said spindle head and interconnected with a motor drive means to perform their milling operation, a table supported from said base and having slots parallel with said ways and extending through an outer gauge surface on said table, said slots extending over said end milling cutters with a slot for each end milling cutter to extend therethrough to mill, a fence on said table gauge surface having a gauge face at right angles to said gauge surface, clamp means supported from said table to clamp a workpiece when gauged by said table gauge surface and said fence gauge face, and feed means for moving said carriage along said ways while said rotary end millers extending through said slots mill the exposed surface of the workpiece in contact with said table gauge surface.

3. The milling machine of claim 2 which also includes table ways on said table gauge surface extending transversely of said slots, and securing bridge means to fasten said fence in different positions along said table ways and support said fence above said table gauge surface to selectively control the number of end milling cutters engaging the workpiece.

4. The milling machine of claim 3 which also includes means to dispose said table ways at right angles to said slots to dispose said fence gauge surface parallel with said slots and produce spaced miller vents.

5. The milling machine of claim 3 which also includes means to dispose said table ways at selected angles to said slots to dispose said fence gauge surface at an angle less than ninety degrees to said slots to vary the spacing between adjacent cuts made by said end milling cutters in the workpiece from zero to parallel relationship, the dimensions of said cuts determined by the diameter of the end milling cutters.

6. The milling machine of claim 2 which includes pivot means interconnecting one end of said table with said base to pivotally support said table in an extended position from said base to expose said housing and carriage, and pad means supported from said base to engage the other end of said table to support said table when said table is retratced toward said base.

7. The milling machine of claim 6 which includes extendable and retractable means in said pad means to change the relative angular position of said table gauge surface relative to said base to mill a tapered surface on said workpiece.

References Cited by the Examiner

UNITED STATES PATENTS

| | | | |
|---|---|---|---|
| 1,326,863 | 12/19 | Heinkel | 90—19 |
| 1,791,758 | 2/31 | Goetz et al. | 90—11 |
| 2,450,350 | 9/48 | Nord | 90—15 |
| 2,520,607 | 8/50 | Meany | 90—15 |
| 2,530,502 | 11/50 | Baney | 90—11 |
| 2,890,627 | 6/59 | Onksen et al. | |
| 3,087,388 | 4/63 | Kuhar. | |

(Other references on following page)

References Cited by the Applicant

UNITED STATES PATENTS

| | | |
|---|---|---|
| 1,297,006 | 11/21 | Jolls. |
| 1,714,213 | 5/29 | Claybourn. |
| 1,734,908 | 11/29 | Jeffries. |
| 1,876,204 | 9/32 | Christman. |
| 1,913,781 | 6/33 | Wiley et al. |
| 2,531,647 | 11/50 | Roesen et al. |
| 2,537,604 | 1/51 | Ricards et al. |
| 2,626,541 | 1/53 | Ricards et al. |

WILLIAM W. DYER, Jr., *Primary Examiner.*